United States Patent
Le Clerc et al.

(10) Patent No.: US 9,947,106 B2
(45) Date of Patent: Apr. 17, 2018

(54) METHOD AND ELECTRONIC DEVICE FOR OBJECT TRACKING IN A LIGHT-FIELD CAPTURE

(71) Applicant: THOMSON LICENSING, Issy les Moulineaux (FR)

(72) Inventors: Francois Le Clerc, L'Hermitage (FR); Philippe Robert, Rennes (FR); Kiran Varanasi, Saarbruecken (DE)

(73) Assignee: Thomson Licensing DTV, Issy-les-Moulineaux (FR)

( * ) Notice: Subject to any disclaimer, the term of this patent is extended or adjusted under 35 U.S.C. 154(b) by 0 days.

(21) Appl. No.: 14/975,665

(22) Filed: Dec. 18, 2015

(65) Prior Publication Data
US 2016/0180545 A1 Jun. 23, 2016

(30) Foreign Application Priority Data
Dec. 18, 2014 (EP) .................................... 14307073

(51) Int. Cl.
*G06K 9/00* (2006.01)
*G06T 7/20* (2017.01)
(Continued)

(52) U.S. Cl.
CPC ........ *G06T 7/2046* (2013.01); *G06K 9/00771* (2013.01); *G06K 9/621* (2013.01);
(Continued)

(58) Field of Classification Search
CPC .. G06K 9/00771; G06K 9/6202; G06K 9/621; G06T 2207/10016;
(Continued)

(56) References Cited

U.S. PATENT DOCUMENTS

| | | | |
|---|---|---|---|
| 8,761,445 B2 | 6/2014 | Shamir et al. | |
| 2009/0092282 A1 | 4/2009 | Avidan et al. | |
| 2013/0034266 A1* | 2/2013 | Shamir | ................ G06K 9/6293 382/103 |

FOREIGN PATENT DOCUMENTS

| | | |
|---|---|---|
| CN | 102243765 | 11/2011 |
| CN | 102436662 | 7/2013 |
| FR | 2912239 | 8/2008 |

OTHER PUBLICATIONS

Gan et al., "Object tracking for a class of dynamic image-based representations", Visual Communications and Image Processing 2005, Proceedings of SPIE vol. 5960, Sep. 15, 2005, pp. 1267-1274.
(Continued)

*Primary Examiner* — Manuchehr Rahmjoo
(74) *Attorney, Agent, or Firm* — Myers Wolin LLC

(57) ABSTRACT

A method and an electronic device for object tracking in a sequence of light-field captures. A data acquisition unit acquires a sequence of light-field captures, wherein each light-field capture comprises a plurality of views. A feature determining unit determines features of an initial visual appearance model for an object of interest in a reference view of a first light-field capture. A feature matching unit matches the features in the reference view and in the further views of the first light-field capture. A feature discarding unit discards features that cannot be well matched in all views of the first light-field capture. An appearance model building unit builds an updated visual appearance model for the object of interest based on the remaining features. Finally, a movement tracking unit tracks the movement of the object of interest in the sequence of light-field captures using the visual appearance model.

15 Claims, 3 Drawing Sheets

(51) Int. Cl.
G06K 9/62 (2006.01)
G06T 7/246 (2017.01)

(52) U.S. Cl.
CPC ............ *G06K 9/6202* (2013.01); *G06T 7/251* (2017.01); *G06T 2207/10016* (2013.01); *G06T 2207/10052* (2013.01); *G06T 2207/20121* (2013.01)

(58) Field of Classification Search
CPC . G06T 2207/10052; G06T 2207/20121; G06T 7/2046; G06T 7/251
USPC ......................................................... 382/103
See application file for complete search history.

(56) References Cited

OTHER PUBLICATIONS

Ghasemi et al., Scale-Invariant Representation of Light Field Images for Object Recognition and Tracking, Computational Imaging XII, Proceedings of SPIE vol. 9020, Mar. 7, 2014, pp. 1-8.

Hare et al., "Struck—Structured Output Tracking with Kernels", IEEE International Conference on Computer Vision, Barcelona, Spain, Nov. 6, 2011, pp. 263-270.

Kalal et al., "Tracking-Learning-Detection", IEEE Transactions on Pattern Analysis and Machine Intelligence, vol. 34, No. 7, Jul. 2012, pp. 1409-1422.

Maddalena et al., "People counting by learning their appearance in a multi-view camera environment", Pattern Recognition Letters, vol. 36, 2014, pp. 125-134.

Puwein et al., "Robust Multi-View Camera Calibration for Wide-Baseline Camera Networks", IEEE Workshop on Applications of Computer Vision, Kona, Hawaii, USA, Jan. 5, 2011, pp. 321-328.

Smeulders et al., "Visual Tracking: An Experimental Survey", IEEE Transactions on Pattern Analysis and Machine Intelligence, vol. 36, No. 7, Jul. 2014, pp. 1442-1468.

Tuytelaars et al., "Local Invariant Feature Detectors: A Survey", Foundations and Trends in Computer Graphics and Vision, vol. 3, No. 3, 2007, pp. 177-280.

Yun et al., "Multi-view ML object tracking with online learning on Riemannian manifolds by combining geometric constraints", IEEE Journal on Emerging and Selected Topics in Circuits and Systems, vol. 3, No. 2, Jun. 2013, pp. 185-197.

Zobel et al., "Object Tracking and Pose Estimation Using Light-Field Object Models", Modeling and Visualization VMV, Erlangen, Germany, Nov. 20, 2002, pp. 1-8.

Yang et al., "Occluded object imaging via optimal camera selection", Proceedings of SPIE, International Society for Optical Engineering, vol. 9067, Dec. 19, 2013, pp. 1-5.

* cited by examiner

METHOD AND ELECTRONIC DEVICE FOR OBJECT TRACKING IN A LIGHT-FIELD CAPTURE

This application claims the benefit, under 35 U.S.C. § 119 of European Patent Application No. 14307073.8, filed Dec. 18, 2014.

FIELD OF THE INVENTION

The invention relates to a method for object tracking in a sequence of light-field captures, wherein the sequence of light-field captures is acquired and each light-field capture has a plurality of views. Furthermore, the invention relates to an electronic device for object tracking in a sequence of light-field captures, wherein the electronic device comprises a data acquisition unit being configured to acquire a sequence of light-field captures, wherein each light-field capture comprises a plurality of views. Finally, the invention relates to an apparatus for processing image data, in particular a video post-production system or a video surveillance system.

BACKGROUND OF THE INVENTION

Visual object tracking refers to the task of estimating the location, and optionally also the scale, of an object of interest in image data, typically in a video. Frequently, the location of the object is specified by a user in a first frame of the image data, for example by means of a bounding rectangle. Visual object tracking is a key component of numerous applications of video processing such as surveillance, robotics, man-machine interaction, post-production and video editing.

Traditional approaches to object tracking rely on matching an appearance model of the object of interest from frame to frame. Various choices of appearance models and associated matching schemes have been proposed in literature, including color histograms, feature points, patch-based features, or the image contents of the bounding box around the object of interest. Recently, discriminative approaches known as "tracking by detection" have been proposed, which compute and adaptively update a classifier in order to optimally discriminate the object of interest from its near background. The image patch in a frame that yields the highest "object" classification score provides the object location estimate for this frame. In more detail, this approach is for example described in [1]. As a variant, [2] proposes to learn online a compatibility function between the appearance of the object and the deformation induced by its motion. Maximizing this compatibility function yields the sought object motion from one frame to the next. The object motion, which is estimated from one frame to the next, forms the "state" of the tracker. Often, the object is assumed to follow a 2D translation, and the state is made up of the horizontal and vertical components of the corresponding 2D translation vector. More complex transformations of the appearance of the object may be considered, including changes of apparent size and shape. In this case, the state vector is enriched with more variables that need to be estimated from frame to frame.

Visual object tracking must cope with changes of appearance of the object over time. These are primarily caused by variations of the object pose, camera viewpoint and lighting conditions. These changes call for an online adaptation of the object appearance model, based on the current estimate of its position.

A comprehensive survey and evaluation of visual tracking methods has been compiled in [3].

SUMMARY OF THE INVENTION

It is an object of the invention to provide a method and an electronic device for object tracking in a sequence of light-field captures, having an enhanced tracking reliability and accuracy. Furthermore, it is an object to provide an enhanced apparatus for processing of image data.

In one embodiment the object is solved by a method for object tracking in a sequence of light-field captures, the method comprising:
   acquiring a sequence of light-field captures, each light-field capture having a plurality of views;
   determining features of a visual appearance model for an object of interest in a reference view of a first light-field capture;
   matching the features in the reference view and in the further views of the first light-field capture;
   discarding features that cannot be well matched in all views of the first light-field capture;
   building a visual appearance model for the object of interest based on the remaining features; and
   tracking a movement of the object of interest in the sequence of light-field captures using the visual appearance model.

Accordingly, a computer readable storage medium has stored therein instructions enabling object tracking in a sequence of light-field captures, which, when executed by a computer, cause the computer to:
   acquire a sequence of light-field captures, each light-field capture having a plurality of views;
   determine features of a visual appearance model for an object of interest in a reference view of a first light-field capture;
   match the features in the reference view and in the further views of the first light-field capture;
   discard features that cannot be well matched in all views of the first light-field capture;
   build a visual appearance model for the object of interest based on the remaining features; and
   track a movement of the object of interest in the sequence of light-field captures using the visual appearance model.

Advantageously, data indicating the movement of the object of interest in the sequence of light-field captures is made available at an output, e.g. for further processing.

The proposed solution is based on the following considerations. Starting with the requirement of online update of the visual appearance model, which is performed to cope with changes of the appearance of the object over time, it is firstly acknowledged that these are based on the current estimate of the object's position. As a result of errors in this estimation, it frequently occurs that part of the background in the vicinity of the object is incorporated into the model of the foreground object of interest. Then, updating the appearance model can lead to tracker drift and potentially to the loss of the target. This issue is aggravated by the inaccuracy of the initial specification of the object. Typically, it cannot be excluded that part of the near background of the object is included in the bounding box, which is provided by the user in the initial frame. In addition to this, partial and temporary global occlusions of the object need to be taken into consideration, depending on the target application.

It has been recognized that a light-field camera is particularly advantageous for the acquisition of image data, for example of video data, providing a suitable basis for object tracking.

A light-field camera enriches the image information content of a conventional monocular camera by simultaneously capturing multiple viewpoints of a scene. These viewpoints are slightly displaced in two directions therefore spanning a plane perpendicular to the camera main axis. Thus, at a given time instant, a light-field camera captures an array of images, each image corresponding to a given viewpoint.

The apparent location of an object in the scene will differ in each of the images. This parallax shift of the object between a pair of images depends on the distance of the object to the camera, i.e. the "depth" of the object.

A light-field capture provides several viewpoints on a scene. The variety of viewpoints generates a variety of appearances of the background in the neighborhood of a foreground object, which is assumed to be the object of interest. The present solution makes use of this diversity of appearances in order to better discriminate object pixels from near-background pixels, in fine improving the segmentation of the object of interest.

This is of particular interest when building a visual appearance model for object tracking based on discrete feature points. According to aspects of the invention, it is checked whether the appearance of each feature image patch is photo-consistent across all the views of the light-field capture. Features that cannot be identified in all views, are—with a very high probability—defined in that they include "misleading" background information, i.e. pixels of a background pattern. These features are rejected for the object model. In other words, the visual appearance model is based on the features, which are successfully matched in all, or most of the views of the light-field capture.

As a result, parts of the background within the tracking bounding box are excluded from the tracking model. The appearance model is enhanced, reducing the chance of drift on model updates. Furthermore, the reliability and accuracy of the tracker is improved.

In an advantageous embodiment, the views of each light-field capture are acquired in a timely synchronized manner. In particular, the views of each light-field capture are acquired simultaneously.

In other words, the images, which are acquired by the light-field camera, are assumed to be synchronized. This is in particular true for plenoptic cameras. In this type of camera, an array of images is formed using an array of microlenses being located directly in front of the camera sensor. A plenoptic camera is a type of camera that applies a microlens array to capture light-field information about a scene. The array of microlenses is placed at the focal plane of the camera main lens. The image sensor of the camera is positioned slightly behind the plane of the microlens array.

The proposed approach provides an improved solution for building the appearance model of an object of interest. The model is for visual tracking of the object, provided that this object remains mostly in the foreground. In situations where the object of interest is occluded, the method according to aspects of the invention is not capable of improving the quality of the object segmentation in the occluded region. However, the method then provides the same performance as a conventional tracker.

The solution applies to the construction of the initial appearance model based on the bounding box around the object of interest in the initial frame of the image data. In an advantageous embodiment, the visual appearance model is refined on-line, which means in the course of tracking the object of interest.

The proposed solution operates within well-known visual tracking schemes. The solution presented herein can be applied to traditional visual tracking methods, which work by matching an appearance model from frame to frame, or to "tracking by detection" approaches. For the latter approaches, it provides relevant input features to build the foreground versus background classifier, or the mapping function yielding the sought displacement estimate as in [2].

In one embodiment, an electronic device for object tracking in a sequence of light-field captures comprises:
- a data acquisition unit configured to acquire a sequence of light-field captures, wherein each light-field capture comprises a plurality of views;
- a feature determining unit configured to determine features of a visual appearance model for an object of interest in a reference view of a first light-field capture;
- a feature matching unit configured to match the features in the reference view and in the further views of the first light-field capture;
- a feature discarding unit configured to discard features that cannot be well matched in all views of the first light-field capture;
- an appearance model building unit configured to build a visual appearance model for the object of interest based on the remaining features;
- a movement tracking unit configured to track a movement of the object of interest in the sequence of light-field captures using the visual appearance model; and
- an output unit configured to output data relative to the movement of the object of interest in the sequence of light-field captures.

In another embodiment, an electronic device for object tracking in a sequence of light-field captures comprises a processing device and a memory device having stored therein instructions, which, when executed by the processing device, cause the electronic device to:
- acquire a sequence of light-field captures, each light-field capture having a plurality of views;
- determine features of a visual appearance model for an object of interest in a reference view of a first light-field capture;
- match the features in the reference view and in the further views of the first light-field capture;
- discard features that cannot be well matched in all views of the first light-field capture;
- build a visual appearance model for the object of interest based on the remaining features; and
- track a movement of the object of interest in the sequence of light-field captures using the visual appearance model.

The electronic device is advantageous in that the performance of the tracker is enhanced, in particular with respect to accuracy and reliability. Further details have been mentioned with respect to the method according to aspects of the invention and shall not be repeated.

In an advantageous embodiment, the data acquisition unit is coupled to a light-field camera, in particular a plenoptic camera.

The object is further solved by an apparatus for processing image data, in particular a video post-production system or a video surveillance system, comprising an electronic device according to one or more aspects of the invention.

Same or similar advantages or advantageous aspects, which have been mentioned with respect to the method for object tracking, apply to the electronic device for object tracking and to the apparatus for processing image data in a same or similar way; consequently, these are not repeated.

Further characteristics of the proposed solution will become apparent from the description of the embodiments together with the claims and the drawings. Embodiments can fulfill individual characteristics or a combination of several characteristics.

DETAILED DESCRIPTION OF PREFERRED EMBODIMENTS

For a better understanding the proposed solution shall now be explained in more detail in the following description with reference to the figures. It is understood that the solution is not limited to these exemplary embodiments and that specified features can also expediently be combined and/or modified without departing from the scope of the present solution as defined in the appended claims.

Figure 1:
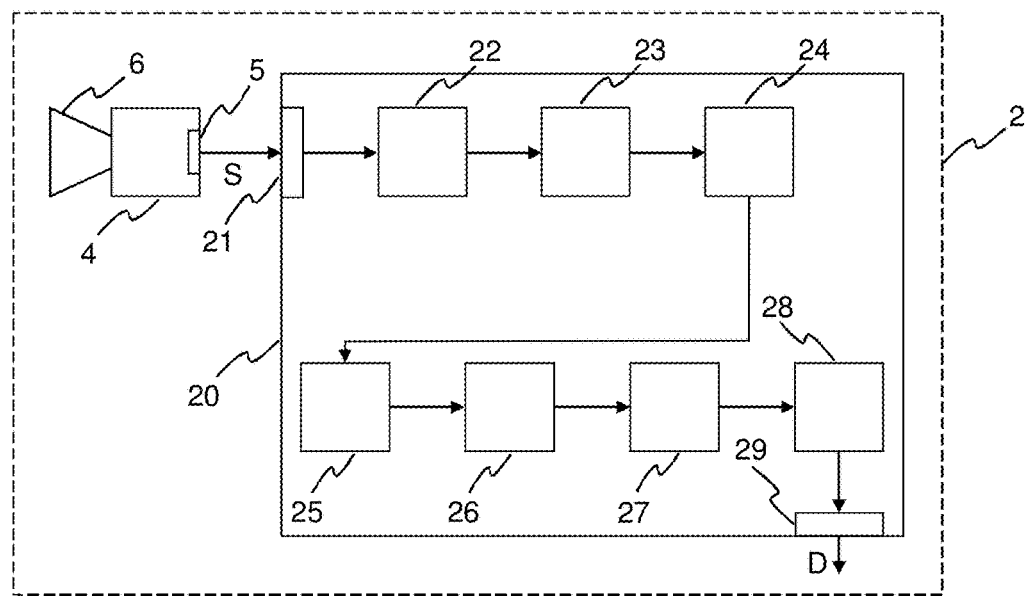
FIG. 1 shows a simplified block diagram of a first embodiment of an electronic device for object tracking in a sequence of light-field captures, which is comprised in an apparatus for processing image data.

FIG. 1 shows a simplified block diagram of an apparatus 2 for processing image data. The image data is, for example, acquired using a camera 4, which, in particular, is a plenoptic camera. Within the context of this specification, a plenoptic camera comprises an array of microlenses, which is placed at the focal plane of the camera 4 main lens 6. An image sensor (not shown) of the camera 4 is arranged slightly behind the plane of the microlens array. The camera 4 is, therefore, suitable for acquisition of a light-field capture, wherein each of said light-field captures comprises a plurality of views. Each view in this light-field capture has a slightly different viewing angle on an object, which is acquired by the camera 4 through its main lens 6. In other words, the camera 4 is configured to capture multiple views of a scene corresponding to slightly displaced viewpoints of the camera 4 in a two dimensional plane, which is perpendicular to the camera 4 main axis. At a given time instant, the camera 4 acquires an array of images or views each corresponding to a given and slightly different view point. Consequently, the apparent location of an object in a scene, which is captured by the camera 4 through its main lens 6, shows a parallax shift of the object between a pair of images.

Figure 2:
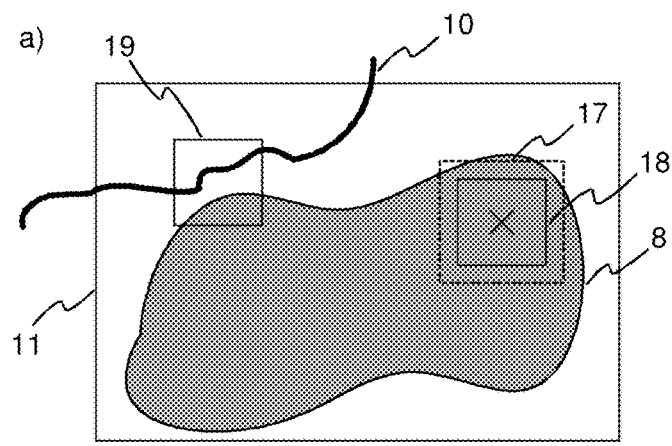
FIG. 2 depicts a first and a second simplified view of a light-field capture.
Figure 2:
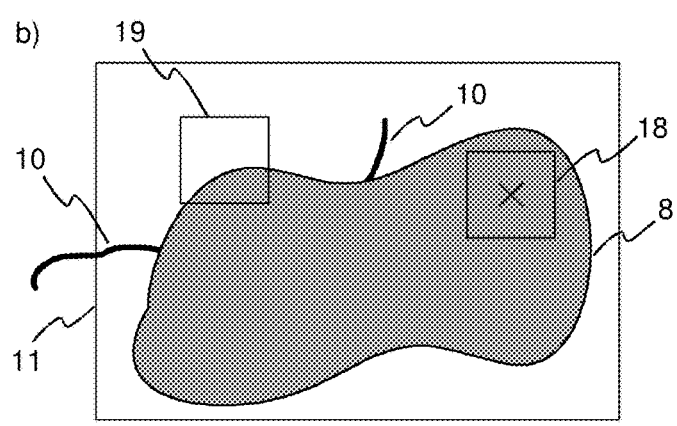

A first and a second view in an exemplary light-field capture are schematically shown in FIGS. 2a and 2b. In a first view, which is shown in FIG. 2a, there is a foreground object 8 and a background object 10, both being entirely visible in the depicted view. By way of an example, the foreground object 8 is the object of interest. The foreground object 8 and the background object 10 do not overlap each other.

In contrast to this, in the second view of the same light-field capture, which is shown in FIG. 2b, the background object 10 is partly occluded by the foreground object 8. This is due to the parallax shift between the two views shown in FIGS. 2a and 2b, respectively.

The camera 4, which is depicted in FIG. 1, provides a stream of image data S at an output terminal 5. Said stream of image data S is input to an electronic device 20 for object tracking in a sequence of light-field captures via an input 21. The stream of image data S comprises a sequence of light-field captures.

In the apparatus 2 for processing of image data, the camera 4 is optional. In other words, according to another embodiment, the apparatus 2 is configured to receive the stream of image data S, for example from a data base or a data reading apparatus, which can form part of the apparatus 2 or can be an external device. In particular, the apparatus 2 for processing of image data according to this embodiment is a post-production system. In this embodiment, the apparatus 2 will preferably receive the stream of image data S from a data medium, for example a hard disc, a blue ray disc or the like, preferably comprising video data.

According to another advantageous embodiment, the apparatus 2 for processing of image data is a video surveillance system. According to this embodiment, the apparatus 2 comprises at least one camera 4, in particular a plurality of cameras being arranged for acquisition of image data in a surveillance area.

The electronic device 20 for object tracking in a sequence of light-field captures comprises a data acquisition unit 22. This is configured to acquire a sequence of light-field captures, wherein each light-field capture comprises a plurality of views. In the stream of image data S, there is a sequence of light-field captures, each light-field capture having a plurality of views, wherein FIGS. 2a and 2b show two views, by way of an example only.

Furthermore, the electronic device 20 comprises a feature determining unit 23. The feature determining unit 23 is configured to determine the features of a visual appearance model for an object of interest in a reference view of first light-field capture. By way of an example, the reference view is the view shown in FIG. 2a. The foreground object 8 shall be the object of interest. The object of interest 8 is marked by a bounding box 11 drawn by a user. The locations of the features within this bounding box 11 are determined automatically by the tracking algorithm. By way of an example, the features can be placed at detected corners within the bounding box, that is to say, pixels whose neighbourhoods contain strong gradients in orthogonal directions.

In FIG. 2a, there is a first feature, which is, by way of an example only, the characteristically curved margin of the foreground object 8 in a first box 18. In addition to this, there is a second box 19 including part of the bent margin of the foreground object 8 and parts of the background object 10. These boxes or feature support areas 18, 19 are not necessarily rectangular as shown in FIG. 2a and FIG. 2b, although it is often the case.

The visual appearance model for the foreground object 8, which is the object of interest, is built from features computed from image patches exemplified in FIG. 2a and FIG. 2b by the areas 18 and 19.

The electronic device 20 further comprises a feature matching unit 24, which is configured to match the features in the reference view, i.e. the view in FIG. 2a, and in further views of the same light-field capture. For example, the features in the two areas 18, 19, which represent the object of interest 8 marked by the user by means of the bounding box 11, are matched to the corresponding features shown in the second view of FIG. 2b. It can be derived from a comparison of the content of the feature support areas 18, 19 in FIG. 2a with the corresponding feature support areas 18, 19 in FIG. 2b that the image content of the first feature in the first support area 18 is identical in both views. In contrast to this, the second feature in the second support area 19 differs in the two views. This is due to the fact that the background object 10 is partly occluded in the second view shown in FIG. 2b. Consequently, the second feature is not identical in the two views, and therefore cannot be well matched in the two views. Hence, a feature discarding unit 25 will discard this second feature.

What has been explained by making reference to only two views in FIGS. 2a and 2b is performed by the electronic device 20 with all views in the light-field capture. As a consequence, the feature discarding unit 25 discards all features from the visual appearance model of the object of interest which cannot be well matched in all views of the light-field capture.

Subsequently, an appearance model building unit 26 builds a visual appearance model for the object of interest based on the remaining features. When making reference to the examples in FIGS. 2a and 2b, this appearance model will comprise the feature in the first area 18, but not feature the feature in the second area 19.

A movement tracking unit 27 will then track the movement of the object of interest in the sequence of light-field captures using the visual appearance model. Determining matching and discarding of features is in particular performed based on the views in a first light-field capture in the stream of light-field captures, which is received by the electronic device 20. The derived visual appearance model is then applied to the subsequent light-field captures, i.e. the views in these light-field captures. Specifically, the tracking unit 27 outputs an estimate of the deformation of the object of interest between the current light-field capture and the next light-field capture in the sequence. Based on this estimate, the location of each feature in the reference view of the current light-field capture can be computed in the reference view of the next light-field capture. The processing then moves on to the next light-field capture in the sequence. The updated locations of the features in this next light-field capture provide the input to the matching unit 24.

The electronic device 20 additionally comprises an output unit 28 configured to output data D at an output terminal 29. The output data D indicates a movement of the object 8 of interest in the sequence of light-field captures. The output terminal 29 can be any suitable interface. The data D may also be stored on a local storage unit. The output terminal 29 may also be combined with the input 21 into a single bidirectional interface.

Of course, the different units 22 to 29 may likewise be fully or partially combined into a single unit or implemented as software running on a processor.

Figure 4:
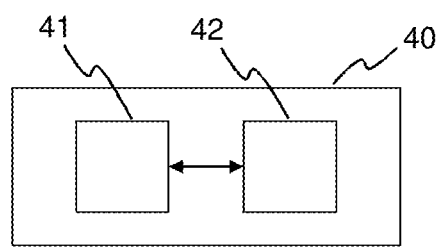
FIG. 4 shows a simplified flow chart illustrating a method of object tracking in a sequence of light-field captures.

Another embodiment of an electronic device 40 for object tracking in a sequence of light-field captures is schematically illustrated in FIG. 4. The electronic device 40 comprises a processing device 41 and a memory device 42 storing instructions that, when executed, cause the apparatus to perform steps according to one of the described methods.

For example, the processing device 41 can be a processor adapted to perform the steps according to one of the described methods. In an embodiment said adaptation comprises that the processor is configured, e.g. programmed, to perform steps according to one of the described methods.

The method for object tracking in the sequence of light-field captures will be explained by making reference to the simplified flow chart in FIG. 3.

After acquiring a sequence of light-field captures in step S0, features of a visual appearance model are determined in step S1 for an object 8 of interest in a reference view of a first light-field capture. The input to the further steps of the method thus comprises a set of localized features representing image patches within the areas 18, 19 inside the location of the object of interest, which is for example the content of the rectangle 11 enclosing the foreground object 8 (FIG. 2a). The method is applicable to any kind of known image patch descriptors, in particular those known from [4], including "Good Features to Track", SIFT, SURF, Local Binary Patterns, or the outputs of filter banks such as Gabor jets.

It is assumed that the tracking is performed on only one of the light-field views, hereafter referred to as the "reference view". The bounding box 11 is placed around the object 8 of interest, which is defined in this view. The features are determined automatically by the tracking algorithm within the bounding box 11. For example, these are the features in the image areas 18, 19 in FIG. 2a.

In step S2, each localized feature in the reference view is matched to all the other views. In particular, this is performed based on a similarity metric associated with the considered type of feature. The matching is restricted to a search window 17 of predetermined size (see FIG. 2a) around the location of the feature in the reference view. Preferably, the size of the search window 17 is computed as a function of the maximal disparity between the considered views and the reference view within the view frustum. For a given feature in the reference view, the highest matching score within the search window 17 is retained in each view. Thus, N−1 matching scores are obtained if the light-field capture consists of N views.

In step S3, a figure of merit is computed for each feature in the reference view, as a function of the matching scores obtained for this feature in step S2. Features that cannot be well matched in all or most of the views are discarded in step S4.

When making reference to the first and second view in FIGS. 2a and 2b, the features that can be well matched are those in the first box 18. In contrast to this, the features in the second box 19 cannot be well matched, since the defined feature comprises pixels of the background object 10 being not visible in the second view shown in FIG. 2b.

For instance, as a preferred embodiment, a feature match is declared reliable if its matching score is greater than a given matching threshold. The matching threshold in question is dependent on the type of feature and the choice of similarity metric used for matching. The figure of merit is then defined as the ratio of reliable matches features to the total number of matches (i.e., N−1). For example, assuming the figure of merit to be normalized to the interval [0.0, 1.0], a feature is discarded if this figure of merit is lower than a predefined threshold of 0.95.

Figure 3:
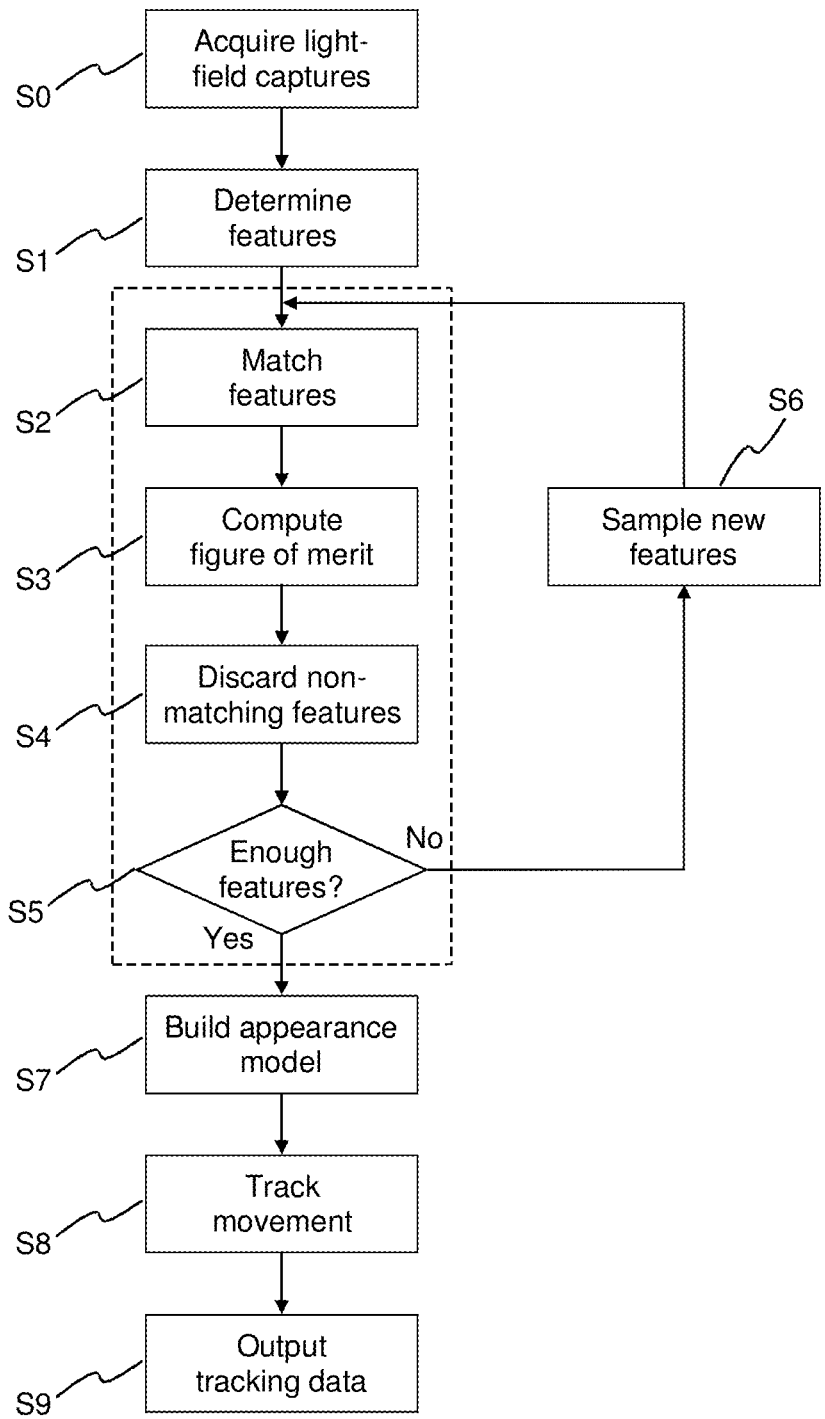
FIG. 3 schematically illustrates a second embodiment of an electronic device for object tracking in a sequence of light-field captures.

In the flow chart of FIG. 3, the subsequent steps S5 and S6 are optional. In step S5, the number of non-discarded features is compared against a predetermined minimum acceptable feature count. If it is greater than or equal to this count, the method proceeds to step S7, else, a new set of features is detected in the current estimate of the object bounding box (step S6). Based on these newly defined features, the operations in steps S2 through S5 are performed on the newly sampled features.

The steps S2 to S6 are iterated until the pass condition in step S5 is met.

In step S7, a visual appearance model or a foreground/background classifier is built from the selected features. This is performed in line with the tracking scheme to which the method is applied. The visual appearance model may for instance be obtained by just stacking the computed features, or by computing a color histogram within the convex hull of the set of features. In "tracking by detection" approaches, a classifier or a mapping function can be built based on the features.

In step S8, the motion of the object, in particular of an object bounding box, is estimated using the appearance model built in step S5. Again, this is performed according to the applied tracking scheme and the locations of the features are updated accordingly. From there on the processing moves on to the next light-field capture. In other words, in step S8 the estimate of the displacement of the object of interest is applied to each feature to predict its location in the next light-field capture.

Finally, tracking data indicating the movement of the object of interest in the sequence of light-field captures is output in step S9.

Embodiments according to the proposed solution can be fulfilled through individual characteristics or a combination of several characteristics. Features which are combined with the wording "in particular" or "especially" are to be treated as preferred embodiments.

CITATIONS

[1] Z. Kalal et al.: "*Tracking-Learning-Detection*", IEEE Transactions on Pattern Analysis and Machine Intelligence, Vol. 34 (2012), pp. 1409-1422.
[2] S. Hare et al.: "*Struck: Structured Output Tracking with Kernels*", 2011 IEEE International Conference on Computer Vision (ICCV), pp. 263-270.
[3] A. Smeulders et al.: "*Visual Tracking: an Experimental Survey*", IEEE Transactions on Pattern Analysis and Machine Intelligence, Vol. 36 (2013), pp. 1442-1468.
[4] T. Tuytelaars et al.: "*Local Invariant Feature Detectors: a Survey*", Foundations and Trends in Computer Graphics and Vision, Vol. 3 (2008), pp. 177-28.

What is claimed, is:

1. A method for object tracking in a sequence of light-field captures, the method comprising:
    acquiring a sequence of light-field captures with a light-field camera, each light-field capture having a plurality of views, the plurality of views corresponding to displaced viewpoints of the camera in a two dimensional plane, which is perpendicular to a main axis of the camera, one view among the plurality of views being a reference view;
    determining features of an initial visual appearance model for an object of interest in the reference view of a first light-field capture;
    matching the features in the reference view and in the further views of the first light-field capture;
    discarding features that cannot be matched in all or most of the views of the first light-field capture;
    building an updated visual appearance model for the object of interest based on the remaining features; and
    tracking a movement of the object of interest in the sequence of light-field captures using the visual appearance model.

2. The method according to claim 1, wherein the views of each light-field capture are acquired in a timely synchronized manner.

3. The method according to claim 1, wherein the matching of the features in the reference view and in the further views of the first light-field capture is based on a similarity metric score.

4. A non-transitory computer readable storage medium having stored therein instructions enabling object tracking in a sequence of light-field captures, which, when executed by a computer, cause the computer to:
    acquire a sequence of light-field captures with a light-field camera, each light-field capture having a plurality of views, the plurality of views corresponding to displaced viewpoints of the camera in a two dimensional plane, which is perpendicular to a main axis of the camera, and one view among the plurality of views being a reference view;
    determine features of an initial visual appearance model for an object of interest in the reference view of a first light-field capture;
    match the features in the reference view and in the further views of the first light-field capture;
    discard features that cannot be matched in all or most of the views of the first light-field capture;
    build an updated visual appearance model for the object of interest based on the remaining features; and
    track a movement of the object of interest in the sequence of light-field captures using the visual appearance model.

5. The non-transitory computer readable storage medium according to claim 4, wherein the instructions cause the computer to acquire the views of each light-field capture in a timely synchronized manner.

6. The non-transitory computer readable storage medium according to claim 4, wherein the matching of the features in the reference view and in the further views of the first light-field capture is based on a similarity metric score.

7. An electronic device for object tracking in a sequence of light-field captures, wherein the electronic device comprises:
    a processor coupled to a memory, the processor being configured to:
    acquire a sequence of light-field captures with a light-field camera, wherein each light-field capture comprises a plurality of views, the plurality of views corresponding to displaced viewpoints of the camera in a two dimensional plane, which is perpendicular to a main axis of the camera, one view among the plurality of views being a reference view;
    determine features of an initial visual appearance model for an object of interest in the reference view of a first light-field capture;
    match the features in the reference view and in the further views of the first light-field capture;
    discard features that cannot be matched in all or most of the views of the first light-field capture;
    build an updated visual appearance model for the object of interest based on the remaining features;
    track a movement of the object of interest in the sequence of light-field captures using the visual appearance model; and
    output data relative to the movement of the object of interest in the sequence of light-field captures.

8. The electronic device according to claim 7, wherein the processor is coupled to a light-field camera.

9. The electronic device according to claim 7, wherein the processor is configured to acquire the views of each light-field capture in a timely synchronized manner.

10. An electronic device for object tracking in a sequence of light-field captures, the electronic device comprising a processing device and a memory device having stored therein instructions, which, when executed by the processing device, cause the electronic device to:

acquire a sequence of light-field captures with a light-field camera, each light-field capture having a plurality of views, the plurality of views corresponding to displaced viewpoints of the camera in a two dimensional plane, which is perpendicular to a main axis of the camera, one view among the plurality of views being a reference view;

determine features of an initial visual appearance model for an object of interest in the reference view of a first light-field capture;

match the features in the reference view and in the further views of the first light-field capture;

discard features that cannot be matched in all or most of the views of the first light-field capture;

build an updated visual appearance model for the object of interest based on the remaining features; and track a movement of the object of interest in the sequence of light-field captures using the visual appearance model.

11. The electronic device according to claim 7, wherein the processor is configured to match the features in the reference view and in the further views of the first light-field capture based on a similarity metric score.

12. An apparatus for processing image data, in particular video post-production system or video surveillance system, comprising the electronic device according to claim 7 or 10.

13. The electronic device according to claim 10, wherein the electronic device is coupled to a light-field camera.

14. The electronic device according to claim 10, wherein the instructions cause the electronic device to acquire the views of each light-field capture in a timely synchronized manner.

15. The electronic device according to claim 10, wherein the processing device causes the electronic device to match the features in the reference view and in the further views of the first light-field capture based on a similarity metric score.

* * * * *